United States Patent [19]
Fein et al.

[11] Patent Number: 6,012,075
[45] Date of Patent: *Jan. 4, 2000

[54] METHOD AND SYSTEM FOR BACKGROUND GRAMMAR CHECKING AN ELECTRONIC DOCUMENT

[75] Inventors: Ronald A. Fein, Seattle; Anthony D. Krueger, Redmond, both of Wash.

[73] Assignee: Microsoft Corporation, Redmond, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/748,998

[22] Filed: Nov. 14, 1996

[51] Int. Cl.[7] ............................ G06F 17/24; G06F 17/27; G06F 3/14
[52] U.S. Cl. ..................... 707/540; 707/531; 707/533; 345/347
[58] Field of Search ................................. 707/533, 539, 707/540, 531; 345/347

[56] References Cited

U.S. PATENT DOCUMENTS

| | | | |
|---|---|---|---|
| 4,994,966 | 2/1991 | Hutchins | 704/9 |
| 5,576,955 | 11/1996 | Newbold et al. | . |
| 5,649,222 | 7/1997 | Mogilevsky | 707/533 |
| 5,678,053 | 10/1997 | Anderson | 707/531 |
| 5,694,610 | 12/1997 | Habib et al. | 707/531 |
| 5,857,198 | 1/1999 | Schmidt | 707/103 |

OTHER PUBLICATIONS

Delisle, Norman M. et al. "Magpie—An Interactive Programming Environment for Pascal." Proceedings of the 18 th Annual Hawaii Conference on System Sciences, pp. 588–595, Jan. 1985.

Primary Examiner—Mark R. Powell
Assistant Examiner—Jeffrey Allen Rossi
Attorney, Agent, or Firm—Jones & Askew, LLP

[57] ABSTRACT

In an electronic word processing system environment, a system and method for verifying the accuracy of the grammatical composition of a sentence in the background. While the word processor is in edit mode, i.e., the user is entering data or commands, it is determined when there is an idle period. An idle period is when the user is not entering data or commands. During an idle period, a sentence is extracted from the electronic document. It is determined whether the sentence is of proper grammatical composition. If the sentence does not have proper grammatical composition, then an error indication is displayed to the user in the context of the electronic document. These tasks may be repeated for each sentence in the document until the entire document has been proofed or the idle period ends. When the user selects the error indication in the document, a pop-up menu is displayed beneath the sentence containing the error. The pop-up menu includes the top three suggestions for correcting the error, a command to ignore the error, and a tunnel to the foreground grammar checker dialog. The pop-up menu may also include a full sentence rewrite that replaces all of the errors in the sentence with the suggestion that will most likely correct each error.

26 Claims, 7 Drawing Sheets

METHOD AND SYSTEM FOR BACKGROUND GRAMMAR CHECKING AN ELECTRONIC DOCUMENT

TECHNICAL FIELD

This invention relates to a system and method for background grammar checking of an electronic document. More particularly, this invention relates to a method and system for verifying the accuracy of the grammatical composition of sentences in an electronic document during an idle period.

BACKGROUND OF THE INVENTION

Documents prepared by non-professional writers often contain grammatical errors. Documents containing grammatical errors may reflect negatively on the writer of the document. For example, the recipient of a document containing grammatical errors may make the presumption that the writer lacks proper education, that the writer is lazy, that the writer prepared the document hastily or that the writer has other negative characteristics. Most writers want to avoid having these presumptions made about them and, thus, try to prepare their documents accurately.

Word processor program modules have been effective in helping users eliminate many grammatical errors in their documents. For example, most modem word processor program modules provide effective tools for proofing the composition of electronic documents. One of these tools is a grammar checker program module which assists the writer of an electronic document in correcting many of the grammatical errors in the electronic document.

Most grammar checker program modules check documents for sentences that may have grammatical errors. Some grammar checker program modules also check sentences for errors such as confused words, accidentally deleted or omitted words, punctuation errors and stylistics problems. If the grammar checker program module detects a possible error, then an indication is provided to the user in the context of a user interface. For many errors, the grammar checker program module will provide suggestions on ways to correct the sentence or improve the writing style of the sentence.

A grammar checker program module usually includes a user interface, or dialog box. The user interfaces for grammar checker program modules are almost invariably the same. Typically, when the user is ready to begin grammar checking a document, he invokes a grammar checker user interface by menu, toolbar, keystroke, or the like. The user interface typically includes the first sentence in the document which contains an error and a list of suggestions to correct the error. The user may accept one of the suggested corrections, modify the sentence himself, or ignore the error. The user interface then displays the next erroneous sentence and the grammar checking continues in the manner described above. When the grammar checker program module is finished checking the document, the user interface closes and the monitor displays the document. Typically, if the user later grammar checks the document, the entire document is re-checked as if the grammar checker program module had never checked it before. For instance, if the user chose to ignore a certain error during a first grammar check, the error will be re-flagged in a second grammar check.

The grammar checking method described above in which a user initiates a grammar checker user interface by menu, toolbar, or keystroke will be referred to as foreground grammar checking. Foreground grammar checking has several drawbacks. One drawback is that foreground grammar checking requires the user to explicitly initiate a grammar check. A user may forget to initiate a grammar check or may be too lazy to initiate a grammar check. Other users may simply not want to initiate a grammar check due to the awkwardness of the grammar checker user interface. Users who do not conduct a grammar check may never detect grammatical errors in their documents and are more likely to publish, mail, or otherwise distribute an erroneous document.

A second drawback of foreground grammar checking is the user interface itself. To many users, the user interface of a foreground grammar checker is unnatural and complex because errors are presented in the context of the user interface rather than the context of the document.

Another drawback of foreground grammar checking is that it is time-consuming. All of the grammar checking happens while the user stares at the screen. Because grammar checking is often a slow process, the user spends a large amount of time waiting idly for the next error to be displayed in the user interface. The user then addresses the error and the process is repeated until the entire document has been grammar checked.

Still another drawback of foreground grammar checking is that on subsequent grammar checks, the entire document is re-checked as if it were entirely a new document. Sentences that were deemed correct in a previous grammar check will be re-checked even if they have not been changed since the last grammar check. This includes sentences that were ignored by the user, i.e., sentences where the grammar checker detected an error, but the user indicated that he did not wish to correct the error. Re-flagging the same sentence on subsequent grammar checks can be highly frustrating to the user. Furthermore, it wastes time to re-check text previously deemed acceptable.

Therefore there is a need in the art for a word processor program module that simplifies the process of grammar checking an electronic document There is also a need for a word processor program module that verifies the accuracy of the grammatical composition of a document in a manner that is intuitive to a user and that presents any errors in a natural setting.

There is also a need for a word processor program module that grammar checks a document in a speedy manner.

There is a further need for a word processor program module that automatically conducts grammar checking so that the user is encouraged to conduct a grammar check and the grammatical composition of documents is improved.

There is still a further need for a word processor program module that does not grammar check a sentence that has been unedited since the previous grammar check.

SUMMARY OF THE INVENTION

The present invention satisfies the above described needs by providing a system and method for background grammar checking an electronic document. A user does not have to execute any commands to grammar check an electronic document and, thus, will be encouraged to execute a grammar check of his documents.

Generally described, the present invention provides a method for verifying the accuracy of grammatical composition of sentences in an electronic document. The method includes storing grammar flags that correspond to the grammar status of ranges of characters in the electronic document. The sentences are automatically grammar checked during idle periods in editing the document. The grammar flags are updated in response to grammar checking the sentences. The grammar flags may also be updated in response to editing the document.

The step of storing grammar flags that correspond to the grammar status of ranges of characters may include storing grammar flags and character positions in a grammar data table to identify a range of characters that are associated with the grammar flag. The grammar flags may include grammarerror, grammar clean, grammarforeign, grammardirty, and grammaredit flags. A grammarerror flag indicates that a range of characters contains a possible grammatical error. A grammarclean flag indicates that a range of characters has been grammar checked and either no errors were found or the errors were ignored by the user. A grammarforeign flag indicates that a range of characters is written in a language that the grammar checker does not recognize. A grammardirty flag indicates that a range of characters needs to be grammar checked. A grammaredit flag indicates that a range of characters has been edited or inserted into the document. In the preferred program, grammaredit flags are converted to grammardirty flags during idle periods so that edited text is re-checked by the grammar checker.

The present invention also preferably includes out-of-date grammarerror flags. For example, when the user selects the Ignore All button, a global counter is incremented. The preferred application program module then compares a grammarerror time stamp (the time when the grammarerror flag was created) with the global counter to determine which sentences need to be grammar checked again. If a grammarerror time stamp is less than the global counter, then the grammarerror flag is "out-of-date" and the sentence containing the grammarerror flag is re-checked. The reason that a sentence containing an out-of-date grammarerror flag is re-checked is that the rule that marked the error may have been turned off as a result of the user selecting the Ignore All button.

In another aspect, the present invention provides a method for grammar checking an electronic document during idle periods. If an idle period is detected, then a text run, or portion, of text to grammar check is determined. A determination is made whether there are any grammardirty flags or out-of-date grammarerror flags in the text run. If so, then the sentence corresponding to the flag is extracted, or parsed, from the document and grammar checked. If the extracted sentence contains at least one grammatical error, then the characters corresponding to the grammatical error are marked with a grammarerror flag and an error indication is displayed. If the sentence does not contain at least one grammatical error, then the characters corresponding to the sentence are marked with a grammarclean flag.

The step of extracting the sentence can be accomplished through sentence-breaking. Briefly described, sentence-breaking involves finding the beginning and end of a sentence in a buffer of text. Sentence-breaking is necessary because grammar checker program modules often require a single, complete sentence to effectively grammar check. The step of extracting can also be accomplished by calling a grammar checker program module, transferring a buffer of text to the grammar checker program module and receiving sentence indices from the grammar checker program module. The sentence indices indicate a beginning point and an end point for a sentence.

Grammar checking an extracted sentence can include calling a grammar checker program module and sending the extracted sentence to the grammar checker program module. The grammatical composition of the extracted sentence is verified and error information is received from the grammar checker program module.

In a another aspect, the present invention provides a method for grammar checking and spell checking an electronic document during idle periods. In response to detecting an idle period, the characters comprising the current paragraph are spell checked and grammar checked. Next, the characters from the top to the bottom of the visible screen are spell checked and grammar checked. The characters from the bottom of the visible screen to the end of the document are spell checked and grammar checked. The characters from the beginning of the document to the insertion point are then spell checked and grammar checked. Any sub-documents of the document are then spell checked and grammar checked.

These and other features, advantages, and aspects of the present invention may be more clearly understood and appreciated from a review of the following detailed description of the disclosed embodiments and by reference to the appended drawings and claims.

DETAILED DESCRIPTION

Figure 1:
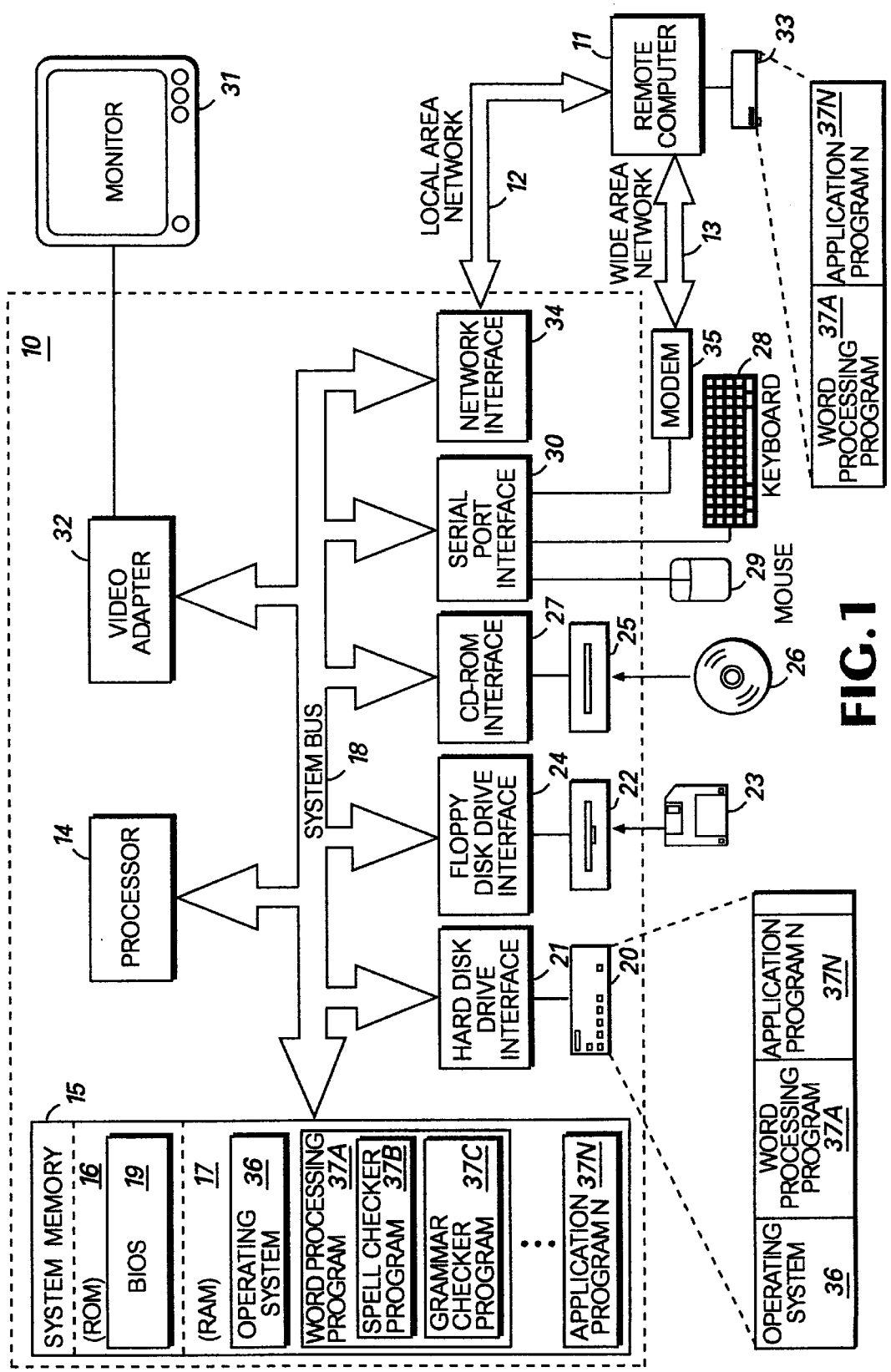
FIG. 1 is a block diagram of a computer that provides the operating environment for the preferred embodiment of the present invention.

The present invention is directed to a method and system for background grammar checking an electronic document. Background grammar checking generally refers to automatically grammar checking a document during idle periods when the word processing program module is in edit mode. The preferred embodiment of the present invention is represented by "WORD", version 8.0, which is a word processing program produced by Microsoft Corporation of Redmond, Wash. Briefly described, the preferred program allows users to create and edit electronic documents by entering characters, symbols, graphical objects, and commands. The preferred program includes a grammar checker program module. During idle periods, i.e., while a user is not entering data or commands, the document is automatically grammar checked in the background. The user does not have to enter any commands to initiate the background grammar check. Any errors detected are indicated to the user in the context of the document, such as by a wavy underline displayed beneath the word or words that comprise the grammatical error.

Although the preferred embodiment will be generally described in the context of a program and an operating system running on a personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations by conventional computer components, including a processor, memory storage devices for the processor, connected display devices, and input devices. Furthermore, these processes and operations may utilize conventional computer components in a heterogeneous distributed computing environment, including remote file servers, compute servers, and memory storage devices. Each of these conventional distributed computing components is accessible by the processor via a communication network.

The processes and operations performed by the computer include the manipulation of signals by a processor or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, values, elements, symbols, characters, terms, numbers, points, records, objects, images, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, calling, comparing, receiving, sending, transferring, transmitting, etc. which are often associated with manual operations performed by a human operator. The operations described herein are machine operations performed in conjunction with various input provided by a human operator or user that interacts with the computer.

In addition, it should be understood that the programs, processes, methods, etc. described herein are not related or limited to any particular computer or apparatus, nor are they related or limited to any particular communication network architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, aspects of the present invention and the preferred operating environment will be described.

The Operating Environment

FIG. 1 illustrates various aspects of the preferred computing environment in which the present invention is designed to operate. Those skilled in the art will immediately appreciate that FIG. 1 and the associated discussion is intended to provide a brief, general description of the preferred computer hardware and program modules, and that additional information is readily available in the appropriate programming manuals, user's guides, and similar publications.

FIG. 1 illustrates a conventional personal computer 10 suitable for supporting the operation of the preferred embodiment of the present invention. As shown in FIG. 1, the personal computer 10 operates in a networked environment with logical connections to a remote computer 11. The logical connections between the personal computer 10 and the remote computer 11 are represented by a local area network 12 and a wide area network 13. Those of ordinary skill in the art will recognize that in this client/server configuration, the remote computer 11 may function as a file server or compute server The personal computer 10 includes a processor 14, such as the 80486 or "PENTIUM" microprocessors manufactured by Intel Corporation of Santa Clara, Calif. The personal computer also includes system memory 15 (including read only memory (ROM) 16 and random access memory (RAM) 17), which is connected to the processor 14 by a system bus 18. The preferred computer 10 utilizes a BIOS 19, which is stored in ROM 16. Those skilled in the art will recognize that the BIOS 19 is a set of basic routines that helps to transfer information between elements within the personal computer 10. Those skilled in the art will also appreciate that the present invention may be implemented on computers having other architectures, such as computers that do not use a BIOS, and those that utilize other microprocessors, such as the "MIPS" or "POWER PC" families of microprocessors from Silicon Graphics and Motorola, respectively.

Within the personal computer 10, a local hard disk drive 20 is connected to the system bus 18 via a hard disk drive interface 21. A floppy disk drive 22, which is used to read or write to a floppy disk 23, is connected to the system bus 18 via a floppy disk drive interface 24. A CD-ROM drive 25, which is used to read a CD-ROM disk 26, is connected to the system bus 18 via a CD-ROM interface 27. A user enters commands and information into the personal computer 10 by using a keyboard 28 and/or pointing device, such as a mouse 29, which are connected to the system bus 18 via a serial port interface 30. Other types of pointing devices (not shown in FIG. 1) include track pads, track balls, and other devices suitable for positioning a cursor on a computer monitor 31. The monitor 31 or other kind of display device is connected to the system bus 18 via a video adapter 32.

The remote computer 11 in this networked environment is connected to a remote memory storage device 33. This remote memory storage device 33 is typically a large capacity device such as a hard disk drive, CD-ROM drive, magneto-optical drive or the like. The personal computer 10 is connected to the remote computer 11 by a network interface 34, which is used to communicate over the local area network 12.

As shown in FIG. 1, the personal computer 10 is also connected to the remote computer 11 by a modem 35, which is used to communicate over the wide area network 13, such as the Internet. The modem 35 is connected to the system bus 18 via the serial port interface 30. The modem 35 also can be connected to the public switched telephone network (PSTN) or community antenna television (CATV) network. Although illustrated in FIG. 1 as external to the personal computer 10, those of ordinary skill in the art will quickly recognize that the modem 35 may also be internal to the personal computer 10, thus communicating directly via the system bus 18. It is important to note that connection to the remote computer 11 via both the local area network 12 and the wide area network 13 is not required, but merely illustrates alternative methods of providing a communication path between the personal computer 10 and the remote computer 11.

Although other internal components of the personal computer 10 are not shown, those of ordinary skill in the art will appreciate that such components and the interconnection between them are well-known. Accordingly, additional details concerning the internal construction of the personal computer 10 need not be disclosed in connection with the present invention.

Those skilled in the art will understand that program modules such as an operating system 36, application programs 37, and data are provided to the personal computer 10 via one of the local or remote memory storage devices, which may include the local hard disk drive 20, floppy disk 23, CD-ROM 26, RAM 17, ROM 16, and the remote memory storage device 33. The application programs 37 may include a number of different programs such as the preferred word processing program 37A, a spell checker program 37B, and a grammar checker program 37C. The spell checker program module 37B and the grammar checker program module 37C are included in the preferred word processing application program module 37A. However, those skilled in the art will recognize that the spell checker program module and grammar checker program module could be implemented as stand-alone program modules. In the preferred personal computer 10, the local hard disk drive 20 is used to store data and programs, including the operating system and programs.

When the personal computer 10 is turned on or reset, the Basic Input/Output System (BIOS) 19, which is stored in the ROM 16, instructs the processor 14 to load the operating system 36 from the hard disk drive 20 into the RAM 17. Once the operating system 36 is loaded into RAM 17, the processor 14 executes the operating system 36 and causes the visual elements associated with the user interface of the operating system 36 to be displayed on the monitor 31.

The operating system 36, in conjunction with the BIOS 19 and associated device drivers, provides the basic interface between the computer's resources, the user, and the application program 37. The operating system 36 interprets and carries out instructions issued by the user. For example, when the user wants to load an application program 37, the operating system 36 interprets the instruction (e.g., double clicking on the application program's icon) and causes the processor 14 to load the program code into RAM 17 from either the local hard disk drive 20, floppy disk 23, CD-ROM 26, or the remote memory storage device 33. Once the application program 37 is loaded into the RAM 17, it is executed by the processor 14. In case of large programs, the processor 14 loads various portions of program modules into RAM 17 as needed.

As described above, the preferred embodiment of the present invention is embodied in the "WORD" program, version 8.0, which is designed to operate in conjunction with Microsoft Corporation's "WINDOWS 95" or "WINDOWS NT" operating systems, or the operating system "MacOS" used in "MACINTOSH" computers manufactured by Apple Computer, Inc. However, it should be understood that the invention can readily be implemented in other operating systems, such as Microsoft Corporation's "WINDOWS 3.1" operating system or IBM Corporation's "OS/2" operating system.

The operating system 36 provides a variety of functions or services that allow an application program 37 to easily deal with various types of input/output (I/O). This allows the application program 37 to issue relatively simple function calls that cause the operating system 36 to perform the steps required to accomplish various tasks, such as displaying text on the monitor 31 or printing text on an attached printer (not shown). Generally described, the application program 37 communicates with the operating system 36 by calling predefined functions provided by the operating system 36. The operating system 36 responds by providing the requested information in a message or by executing the requested task.

The Common Grammar Application Programming Interface

As mentioned above, the preferred word processing program module 37A, "WORD", version 8.0, includes a grammar checker program module 37C. In the context of the present invention, the primary interaction between the preferred program module 37A and the grammar checker program module 37C involves grammar checking related tasks. The grammar checker program module 37C preferably conforms to the Common Grammar Application Programming Interface (CGAPI). The CGAPI is designed to make it easy for programmers to write applications that can utilize a grammar checker program module while being independent of the underlying grammar checker program module. The CGAPI provides functions that can be used to implement sophisticated grammar checking features with a relatively small amount of code.

It will be appreciated that the CGAPI provides a wide variety of features and functions in addition to those included in the brief description presented above. For additional information regarding the CGAPI, the reader may refer to the CGAPI documentation, entitled Common Grammar Application Programming Interface (CGAPI), which is published by Microsoft Corporation, and which is incorporated herein by reference.

Although the grammar checker program module 37C preferably conforms to the CGAPI, it should be understood that a different application programming interface could be implemented without departing from the spirit and scope of the present invention.

Elements of the Preferred Application Program Module

Figure 2:
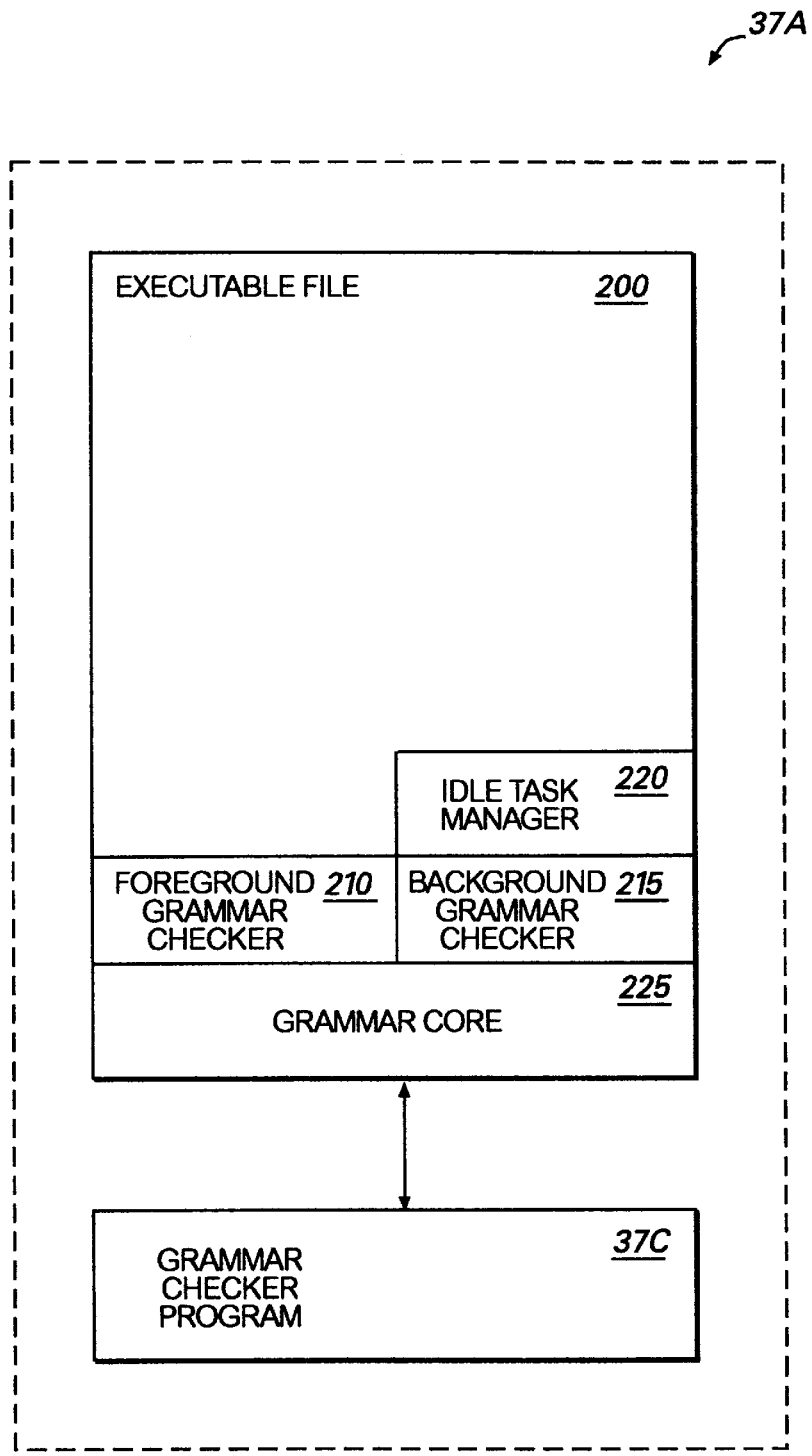
FIG. 2 is a block diagram illustrating the elements in the preferred application program module relating to background grammar checking.

Having briefly described the CGAPI, a description of the elements in the preferred application program module 37A relating to background grammar checking will be provided. FIG. 2 illustrates the elements of the preferred application program module 37A related to background grammar checking. The code in the preferred application program module 37A related to grammar checking resides in an executable file 200. The grammar checker program module 37C, a dynamic linked library, is also shown in FIG. 2.

The executable file 200 includes a foreground grammar checker 210. The foreground grammar checker 210 is a grammar checking feature that is specifically invoked by the user. The executable file 200 also includes a background grammar checker 215. In contrast to the foreground grammar checker 210, the background grammar checker does not have to be specifically invoked by the user. Instead, the background grammar checker 210 issues instructions to perform grammar checking automatically during idle periods. Unlike the foreground grammar checker 210, the background grammar checker 215 does not report errors in a user interface immediately when errors are found. Instead, while background grammar checking the document, the background grammar checker 215 maintains a grammar data table of grammar status data including the locations of errors. The background grammar checker 215 also displays an error indication that can be selected by the user to invoke a pop-up menu.

The executable file 200 further includes an idle task manager 220 which manages tasks performed in the background. "Background" in this context means that the preferred application program module is idle, such as when the user is not typing and when no other commands are being executed. During an idle period, the idle task manager determines which idle tasks need to be performed based on a priority scheme. Those skilled in the art will be familiar with the operations and tasks performed by an idle task manager, including managing the order of performance of idle tasks during an idle period based on a priority scheme.

The executable file 200 also includes grammar core 225 which provides grammar services to both the foreground grammar checker 215 and the background grammar checker 220. Some examples of the services performed by the grammar core are sending a sentence to the grammar checker program module for grammar checking, determining which document and subdocument is being grammar checked, fetching text, and filtering out hidden or special characters.

The preferred application program module 37A further includes a grammar checker program module 37C. The grammar checker program module 37C checks the grammatical composition of a sentence sent to it by the grammar core 225. In addition to grammar checking a sentence, the grammar checker program module can determine the sentence boundaries of a buffer of text and perform other tasks that are known to those skilled in the art.

Grammar Data Table

The preferred application program module 37A stores grammar data in a grammar data table. The grammar data includes character positions, grammar flags and time stamps. The grammar data table comprises cells in which are stored values corresponding to character positions, grammar flags and time stamps. The grammar data table for a document is stored in memory using a dynamic array.

Grammar flags indicate the current grammar status of a range of text. In the preferred application program module, the grammar flags are referred to as grammarclean, grammardirty, grammaredit, grammarerror and grammarforeign a. The grammarclean flag indicates that the range of text is "clean", i.e., the text has been grammar checked and either no errors were found or the errors for that range of text were ignored. The grammardirty flag indicates that the corresponding range of text is "dirty", i.e., the text needs to be grammar checked.

The grammaredit flag indicates that the range of text has been edited, deleted, entered or otherwise pasted into the document. A sentence containing a range of text with a grammaredit flag is marked with a grammardirty flag during the next idle period and the grammaredit flag is removed. This process will be described further in reference to FIG. 3.

A grammarerror flag indicates that the range of text contains a grammatical error as determined by the grammar checker program module. The grammarerror flag is also used by the preferred application program module to provide an error indication, such as a wavy underline, representing that there is an error in the range of text.

The grammarforeign flag indicates that the text is in a language that the grammar checker program module does not recognize. The background grammar checker treats the text marked grammarforeign as grammatically correct, but this text is grammar checked if the document is opened when an appropriate foreign grammar checker is available.

In addition to being useful for background grammar checking, it should be understood that the grammar flags also prove useful for foreground grammar checking. When foreground grammar checking, the preferred application program module consults the grammar flags to determine which sentences need to be grammar checked, which sentences contain errors, which sentences are foreign, etc. Thus, if a sentence has been background grammar checked, then the sentence does not need to be re-checked by the foreground grammar checker unless it has been edited or a grammarerror flag is out-of-date. Thus, the speed of foreground grammar checking is increased.

The grammar flags also provide an advantage because they are saved with a document. Once a sentence has been grammar checked, it does not need to be grammar checked again unless it is edited or contains an out-of-date grammarerror flag. Thus, the speed of foreground grammar checking and background grammar checking are increased because the grammar flags for a document are saved with the document.

The grammar data table also includes character positions. A character position is an integer corresponding to the placement of a character in a document. For example, the character position of the first character in a document is zero, the second character is one, and so on. The cells in the table list the character position of the first character in a range of characters having the same grammar status. Thus, the table only stores grammar flags corresponding to character positions where the grammar status changes.

The grammar data table also includes a time stamp corresponding to each grammar flag. The time stamp is an integer value that indicates the time when the grammar flag was created. Time stamps are important in tracking changes that the user may make to the document. For example, consider three sentences, each with a subject-verb agreement error. During background grammar checking, each of the errors in the three sentences is marked with a grammarerror flag. It is possible that the user may address the first error by choosing the Ignore All button of the foreground grammar checker user interface. The Ignore All button causes the grammar checker program module to ignore all errors of that "type", such as errors involving subject-verb agreement. However, without a time stamp, the errors that were already found would usually not be re-checked. Thus, these errors would be indicated to the user even though the user wished to ignore all errors of that type.

Time stamps alleviate this problem by allowing the preferred application program module to determine which sentences with grammarerror flags need to be re-checked. For example, when the user selects the Ignore All button, a global counter is incremented, such as from the value of three to the value of four. The preferred application program module then compares each grammarerror time stamp with the global counter to determine which sentences needs to be grammar checked again. If a grammarerror time stamp is less than the global counter, then the grammarerror flag is "out-of-date" and the sentence containing the grammarerror flag is re-checked. The reason that a sentence containing an out-of-date grammarerror flag is re-checked is that the rule that marked the error may have been turned off as a result of the user selecting the Ignore All button.

Figure 3:
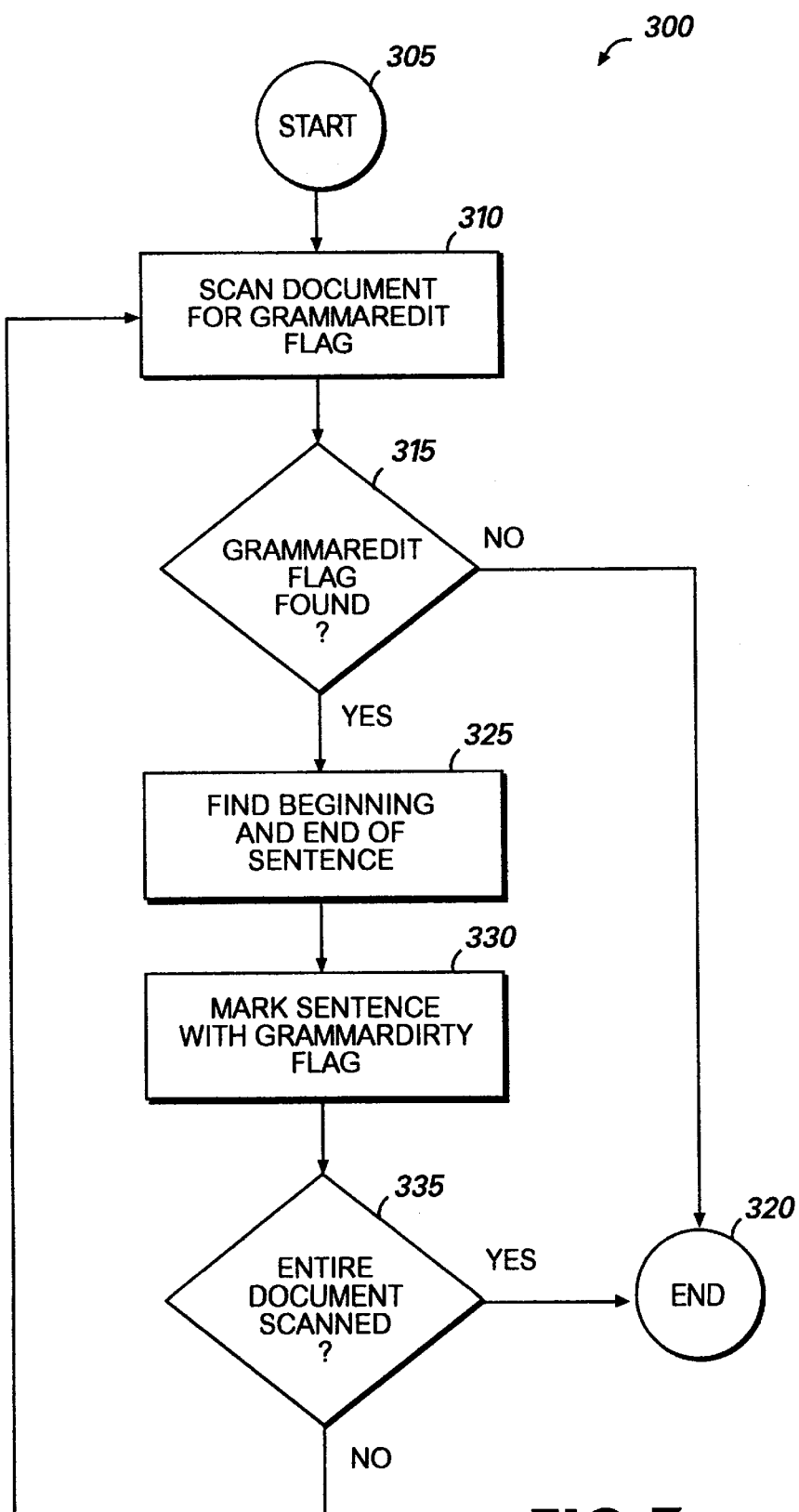
FIG. 3 is a flow diagram of a process for converting grammaredit flags into grammardirty flags.

Referring now to FIG. 3, the process 300 of converting grammaredit flags into grammardirty flags will be described. At step 305 the process starts and proceeds to step 310 when the idle task manager determines that there is an idle period and that all of the tasks with a higher priority than grammaredit flag conversion have been performed. At step 310, the document is scanned for a grammaredit flag.

At decision step 315, it is determined whether a grammaredit flag was found at step 310. If a grammaredit flag was not found at step 310, then the process ends at step 320. However, if, at decision step 315, it is determined that a grammaredit flag was found, then the method proceeds to step 325.

At step 325, the beginning and end of the sentence containing the grammaredit flag are found. The characters comprising the sentence are marked with a grammardirty flag at step 330.

The process then proceeds to decision step 335. It is determined whether the entire document has been scanned for grammaredit flags at decision step 335. If the entire document has been scanned for grammaredit flags, then the process ends at step 320. However, if the entire document has not been scanned for grammaredit flags, then the process returns to step 310 so that the document can continue to be scanned.

The following example will help in understanding the grammar data table and the process of converting grammaredit flags to grammardirty flags. Table 1 shows a short document and the corresponding character positions of the characters in the document.

TABLE 1

| H | e |   | i | s |   | t | a | l | l | . |    |
|---|---|---|---|---|---|---|---|---|---|---|----|
| 0 | 1 | 2 | 3 | 4 | 5 | 6 | 7 | 8 | 9 | 10| 11 |

Assuming that the sentence shown in Table 1 has already been grammar checked, then the grammar data table would appear as shown in Table 2 (excluding time stamps).

TABLE 2

| Grammarclean | End of Document |
|---|---|
| 0 | 11 |

Suppose that the document was edited to appear as shown in Table 3.

TABLE 3

| H | e |   | i | s |   | v | e | r | y |    | t  | a  | l  | l  | .  |
|---|---|---|---|---|---|---|---|---|---|----|----|----|----|----|----|
| 0 | 1 | 2 | 3 | 4 | 5 | 6 | 7 | 8 | 9 | 10 | 11 | 12 | 13 | 14 | 15 | 16 |

After the editing, the grammar data table for the document would appear as shown in Table 4.

TABLE 4

| Grammarclean | Grammaredit | Grammarclean | End of Document |
|---|---|---|---|
| 0 | 6 | 10 | 16 |

Then during the next idle period, the grammaredit flag would be converted to a grammardirty flag by the process described above in reference to FIG. 3. After this conversion, the grammar data table would then appear as is shown in Table 5.

TABLE 5

| Grammardirty | End of Document |
|---|---|
| 0 | 16 |

Thus, the entire sentence will be grammar checked again by the grammar checker program module because the characters are marked with a grammardirty flag.

In addition to a grammar data table including grammar flags, it should be understood that the preferred application program module includes a table of spelling flags. The spelling flags indicate the spelling status of a range of text and are similar, in many respects, to the grammar flags. The spelling flags are worth mentioning in the context of the preferred embodiment of the present invention because it should be kept in mind that a sentence must be spell checked by the spell checker program module 37B, i.e., marked with a spellingclean flag, before it can be properly grammar checked by the grammar checker program module 37C.

Order of Background Spell Checking and Background Grammar Checking

It is important to note that the preferred application program module includes a method for background spell checking a document in addition to the background grammar checking method of the present invention. The documents to be proofed, i.e., spell checked and grammar checked, are divided into text runs. Each text run is a portion of a document. Each text run is background spell checked first and then background grammar checked.

Figure 4:
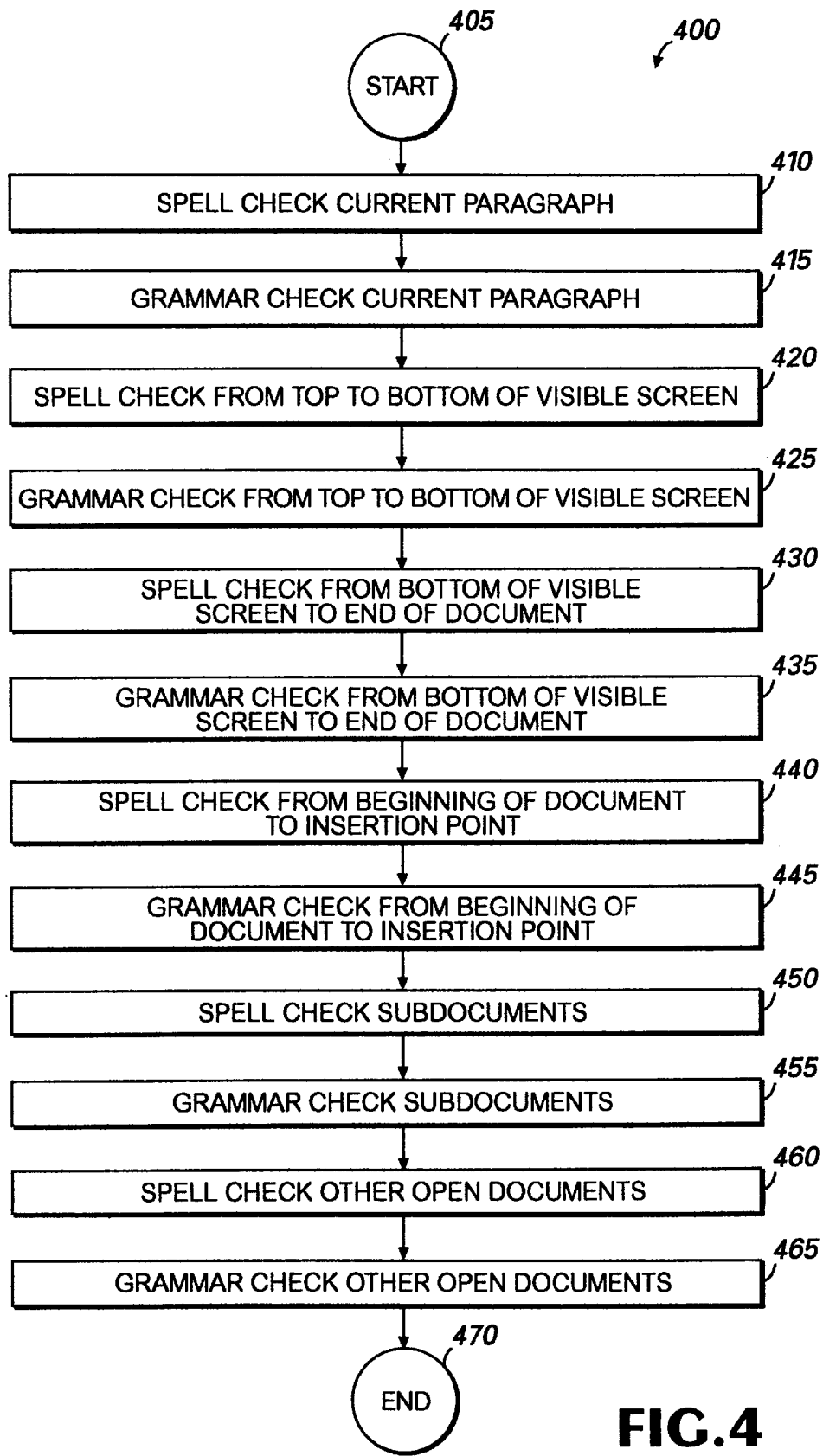
FIG. 4 is a flow diagram illustrating the preferred order in which text runs are spell checked and grammar checked.

FIG. 4 is a flow diagram illustrating the preferred order in which text runs are spell checked and grammar checked. Although spell checking will not be described in detail, it should be understood that spell checking preferably is performed before grammar checking because most grammar checker program modules work most efficiently with correctly spelled words. Thus, FIG. 4 illustrates the manner in which spell checking of text runs is interleaved with grammar checking of text runs during an idle period. A more detailed description of background spell checking is provided in U.S. patent application Ser. No. 08/437,949, which is incorporated by reference herein.

Referring to FIG. 4, the method 400 for background proofing of documents begins at start step 405. The method proceeds to step 410 after other idle tasks with a higher priority than background spell checking and background grammar checking, if any, have been performed. Idle tasks are performed based upon a priority scheme. Tasks with a high priority are performed before tasks with a lower priority.

The current paragraph that is being edited is background spell checked at step 410. Preferably, this step is performed by spell checking all words in the range of 30 characters before and 30 characters after the insertion point, or blinking cursor. If text is selected, the range beginning 30 characters before the beginning of the selected text and ending 30 characters after the selected text is spell checked.

At step 415, the current paragraph that is being edited is background grammar checked. At step 420, the text from the top of the visible screen of the monitor 31 (FIG. 1) to the bottom of the visible screen, excluding the characters that were spell checked at step 410, is spell checked. The preferred application program monitors the characters that are displayed to the user on the visible screen of the monitor. These are the characters that are spell checked at step 420.

The characters from the top of the visible screen to the bottom of the visible screen are next grammar checked at step 425. However, any characters that were grammar checked at step 415 are not checked again at step 425.

At step 430, the characters from the bottom of the visible screen to the end of the document are spell checked. At step 435, the characters from the bottom of the visible screen to the end of the document are grammar checked. A spell check of the characters from the beginning of the document to the insertion point, blinking cursor, or selection, if one exists, is performed at step 440. A grammar check of the characters from the beginning of the document to the insertion point is performed at step 445.

At step 450, subdocuments are spell checked. Subdocuments can comprise textboxes, footnotes, endnotes, headers, footers and annotations. The subdocuments are grammar checked at step 455. Any other open documents, besides the present document that is being edited, are spell checked at step 460. At step 465, the other open documents are grammar checked. At step 470, the background proofing ends and the idle task with the next priority is performed.

The order of background proofing described above ensures that the part of the document that the user is viewing will be proofed first. The order also ensures that the bottom of the document is proofed before the beginning of the document because the user typically adds text to the end of the document and because the beginning of the document will usually have already been proofed. Although the order of text runs shown in FIG. 4 is preferable, it should be understood that any order of proofing a document is acceptable. It should also be understood that it is preferable that background spell checking be performed before background grammar checking. However, adequate results can typically be obtained even if background spell checking is not performed before background grammar checking.

Having described the order of proofing a document by first spell checking a text run and then grammar checking the text run, the preferred method for background grammar checking a text run will be described below in further detail.

Background Grammar Checking

Most word processor program modules include a grammar checker program module. At any time during or after the composition of a document, a user of one of these word processor program modules may grammar check his document by executing a grammar check command. The process of explicitly initiating a grammar checking session by executing a grammar check command will be referred to as foreground grammar checking. For many reasons, users often do not foreground grammar check their documents and many grammatical errors go undetected.

Briefly described, the present invention provides a system for background grammar checking an electronic document. Background grammar checking generally refers to grammar checking a document during idle periods (when the user is not entering data or commands). An idle period is a period of time between commands entered, characters typed and other events. Idle periods are granular, e.g., for a computer with a fast processor 14 (FIG. 1), an idle period may occur between characters typed by a user. The preferred program background grammar checks and background spell checks only portions of the document at a time. These portions of a document are known as text runs. In the preferred program, grammar flags are stored in a grammar data table. The grammar flags correspond to a range of characters and indicate whether that range of characters has been grammar checked or not grammar checked. During an idle period, the preferred program searches for a range of characters, or text, in a text run that needs to be grammar checked based upon the grammar flag corresponding to the range of characters.

The sentence that includes the range of characters marked with a grammardirty flag or out-of-date grammarerror flag is found and extracted. This sentence is then automatically grammar checked. If no grammatical errors are found, the sentence is marked with a grammarclean flag. However, if a grammatical error is found, the characters corresponding to the grammatical error are marked with a grammarerror flag and an error indication is displayed in the context of the document. If the user selects the error indication, the preferred program will display on a display device, such as the display 31 (FIG. 1), a pop-up menu including suggestions that are received by calling the grammar checker program module.

Figure 5:
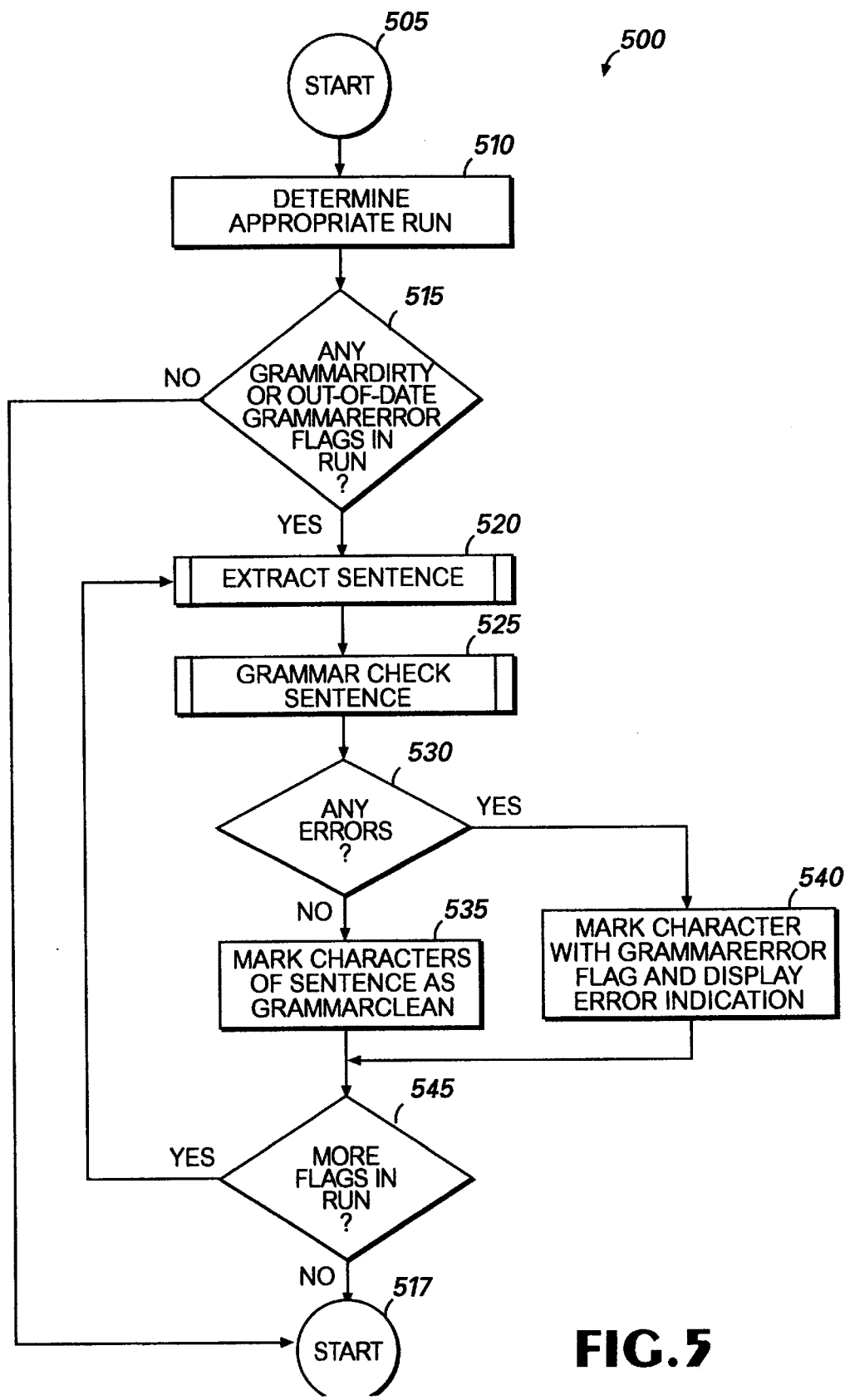
FIG. 5 is a flow diagram illustrating the preferred method for verifying the accuracy of the grammatical composition of a document in the background.

Having briefly described background grammar checking, a more detailed description of background grammar checking will be presented below. FIG. 5 is a flow diagram illustrating the preferred method 500 by which the accuracy of the grammatical composition of a document is verified in the background. Those skilled in the art will appreciate that the present invention is a computer-implemented process that is carried out by the computer in response to input from the user and instructions provided by the preferred application program module and the preferred grammar checker program module.

The method 500 begins at start step 505 and proceeds to step 510 when the idle task manager determines that there is an idle period and that the tasks with a higher priority than background grammar checking have been performed. The idle task manager performs a number of tasks in a predetermined order during an idle period. For example, other idle tasks performed during an idle period may include background repagination, background printing, background spell checking, background saving, and converting grammaredit flags to grammardirty flags, among others. Each of these background tasks is assigned a priority that determines in what order the task is performed during the idle period.

Background spell checking is a task that preferably has the same priority as background grammar checking or a higher priority than background grammar checking. In addition, background spell checking is preferably performed for the appropriate text run before the method 500 for background grammar checking can begin. This is because most grammar checker program modules require correctly spelled words to determine whether there are any grammatical errors in a sentence.

At step 510, the appropriate text run is determined. As described above, documents are divided into text rns. A text run is a portion of text from a document. Dividing a document into text runs facilitates the grammar checking of the document so that the parts of a document that need to be checked first are checked before other parts of a document that are less likely to contain errors. The preferred order of spell checking and grammar checking of text runs was described above in reference to FIG. 4.

Referring still to FIG. 5, the appropriate text run is determined at step 510 based on the priority of text runs that is shown in FIG. 4. For example, the first text run is the current paragraph, the second text run is from the top of the visible screen to the bottom of the visible screen, etc. After the appropriate text run is located at step 510, it is determined whether there are any grammardirty flags or out-of-date grammarerror flags in the text run at decision step 515.

If, at decision step 515, it is determined that there are not any grammardirty flags or out-of-date grammarerror flags in the text run, then the method ends at step 517. The preferred application program is now available to receive instruction from the idle task manager regarding the next idle task to perform. For example, if no grammardirty flags or out-of-date grammarerror flags are found in the text run, the idle task manager may instruct the background spell checker to perform a background spell check on the next text run. In another embodiment (not shown), if no grammardirty flags or out-of-date grammarerror flags are found in the text run, then the remaining text runs are background grammar checked according to method 500 until every text run has been grammar checked.

If, at decision step 515, a grammardirty flag or out-of-date grammarerror flag is found, then the sentence containing the grammardirty flag or out-of-date grammarerror flag is extracted at step 520. Extracting a sentence means determining the beginning character position and ending character position of a sentence.

After the sentence containing the grammardirty flag or out-of-date grammarerror flag is extracted at step 520, then the sentence is sent to the grammar checker program and grammar checked at step 525.

At decision step 530, it is determined whether any errors were received from the grammar checker program module at step 525. If it is determined that no errors were received from the grammar checker program module, then the method proceeds to step 535 and the sentence is marked with a grammarclean flag.

However, if, at decision step 530, it is determined that there was at least one error returned by the grammar checker program module, then the method proceeds to step 540. At step 540, the characters comprising the error in the sentence are marked with a grammarerror flags. If there is more than one error in the sentence, then the first error for which the grammar checker program module has suggestions is marked with a grammarerror flag.

In addition to marking the characters with a grammarerror flag, an error indication is displayed to the user corresponding to the characters comprising the error in the sentence. It should be understood that, although only one error is displayed with an error indication, the error may extend over several words. For example, the following sentence contains one subject-verb agreement error: "The museum in Seattle promote culture." However, the preferred embodiment would mark both words, "museum" and "promote", which comprise the error with a grammarerror flag and would present an error indication. Although it is preferable to display only one error with an error indication to limit the amount of clutter displayed to the user, any number of error indications can be displayed to the user in alternative embodiments of the invention.

After marking the sentence with a grammarclean flag at step 535 or marking the characters comprising an error with a grammarerror flag at step 540, the method proceeds to decision step 545. A determination is made whether there are any more grammardirty flags or out-of-date grammarerror flags in the text run at decision step 545. If it is determined that there are no more grammardirty flags or out-of-date grammarerror flags in the text run being checked, then the method ends at step 517 and the preferred application program receives instruction from the idle task manager as to the next idle task to perform.

However, if at decision step 545, it is determined that there is at least one more grammardirty flag or out-of-date grammarerror flag in the text run being checked, then the method returns to step 520 to extract the next sentence containing a grammardirty flag or out-of-date grammarerror flag.

Figure 6:
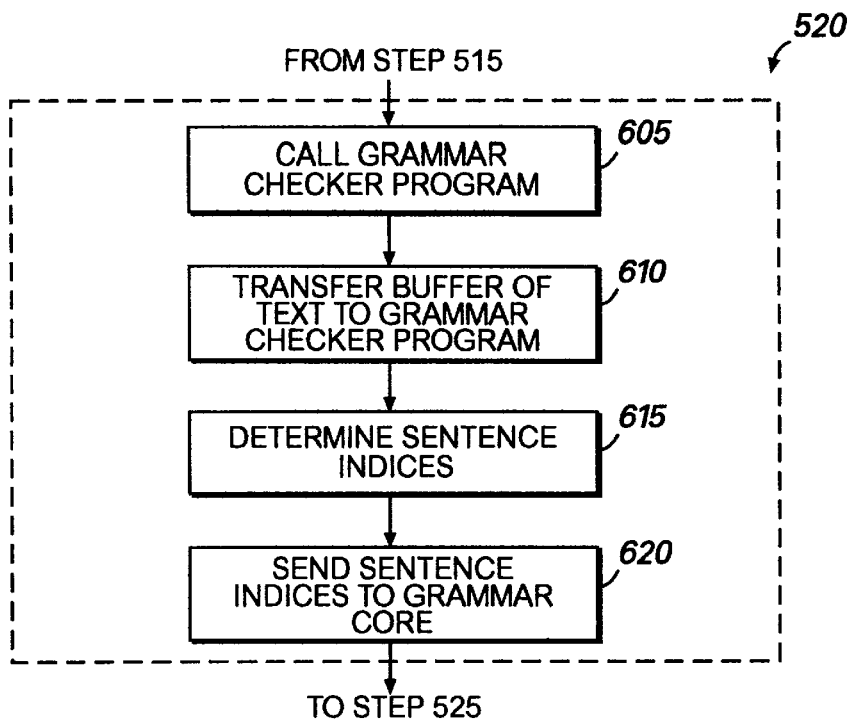
FIG. 6 is a flow diagram illustrating the preferred process for extracting a sentence containing a grammardirty flag or out-of-date grammarerror flag from the document.

FIG. 6 is a flow diagram illustrating the preferred process to execute step 520 of FIG. 5, i.e., extracting a sentence containing a grammardirty flag or out-of-date grammarerror flag. Those skilled in the art will be familiar with the process of extracting a sentence, also known as sentence-breaking. Sentence-breaking is necessary because grammar checker program modules often require a single, complete sentence to effectively grammar check that sentence. Most word processor program modules contain functionality to sentence-break a document into sentences. However, preferably, the sentence-breaking is performed by the grammar checker program module.

Referring to FIG. 6, at step 605, the process begins when a grammardirty flag or out-of-date grammarerror flag is located and the grammar checker program module is called to initiate a grammar checking session. The grammar checker program module is preferably called by the background grammar checker. As discussed above, commands to the grammar checker program module are preferably made by using functions described in the Common Grammar Application Programming Interface (CGAPI), which is published by Microsoft Corporation of Redmond, Washington. The preferred CGAPI function to initiate a grammar checking session is GramInit, or its newer variant, GramInitEx.

After the grammar checker program module is called at step 605 and a grammar checking session is initiated, a buffer of text from the document being proofed is transferred to the grammar checker program module at step 610. The buffer of text will preferably be a range of characters that includes the range of characters marked with a grammardirty flag or out-of-date grammarerror flag and a predetermined number of characters before and after these flags.

At step 615, the grammar checker program module determines the sentence indices, the beginning and end of a sentence, of the buffer of text that was transferred to the grammar checker program module in step 610. The sentence that is located by the grammar checker program module is the sentence that will be grammar checked. As those skilled in the art will understand, to locate a sentence, the CGAPI function GramCheck is initiated. Then, an argument called "grammar check command code", or gcc, is initiated which lets the application program module choose between tasks such as verify buffer, report sentence limits, generate statistics, etc. In response to the grammar check command code, the grammar checker program module sends sentence indices indicative of the beginning point and end point of the sentence to the grammar core of the preferred application program module at step 620. Those skilled in the art will understand that if the buffer of text did not contain a full sentence, then a buffer of text containing more characters will be sent to the grammar checker program module. This process is continued until a pair of sentence boundaries is determined.

Figure 7:
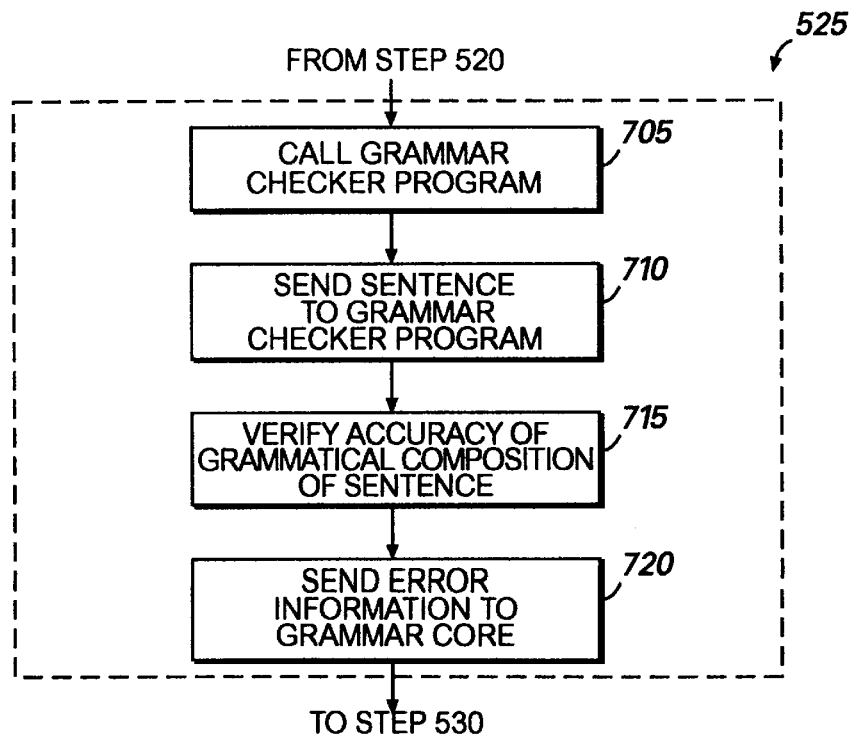
FIG. 7 is a flow diagram illustrating the preferred process for grammar checking a sentence.

FIG. 7 is a flow diagram illustrating the preferred process for executing step 525 of FIG. 5, i.e., grammar checking the sentence. Referring to FIG. 7, the grammar checker program module is called at step 705 and a grammar checking session is initiated. As mentioned above, commands to the grammar checker program module are preferably made using the functions described in the Common Grammar Application Programming Interface (CGAPI) published by Microsoft Corporation. The CGAPI function to call a grammar checker and initiate a grammar checking session, is GramInit or its newer variant, GramInitEx.

The sentence with the grammardirty flag or out-of-date grammarerror flag is sent to the grammar checker program module at step 710. At step 715, the grammar checker program module verifies the accuracy of the grammatical composition of the sentence. As is well-known in the art, a grammar checker program module verifies the accuracy of the grammatical composition of a sentence by applying common grammar rules such as subject-verb agreement. If the sentence violates one of the rules in the grammar checker program module, then the grammar checker program module flags the sentence as a sentence that is possibly grammatically incorrect.

Preferably, the grammar checker program module verifies the accuracy of the grammatical composition of the sentence at step 715 in response to a CGAPI function from the grammar core of the preferred application program module. The CGAPI function to check the grammar of a sentence is GramCheck.

After the grammar checker program module has verified the accuracy of the grammatical composition of the sentence, the grammar checker program module sends error information to the preferred application program module and it is received by the grammar core at step 720. The error information is indicative of whether or not the sentence sent to the grammar checker at step 710 violates a grammar rule of the grammar checker. The grammar core of the preferred application program module receives the error information from the grammar checker program module and the method proceeds to step 530 of FIG. 5.

Grammar Pop-up Menu

Having described the present invention, a more detailed description of the grammar pop-up menu, or background grammar screen display, of the preferred program module will be presented below in reference to FIG. 8.

As described above, when a grammatical error is detected by the background grammar checking method and system of the present invention, an error indication, preferably a wavy underline, is displayed to the user in the context of the electronic document corresponding to the characters that are marked with a grammarerror flag. For example, FIG. 8 is an illustration of a grammar pop-up menu 800 that is displayed by the preferred application program module when the user selects an error indication in the electronic document.

A sentence 805 is shown in which an error 807 has been detected by background grammar checking. The sentence 805 is displayed in the normal context of the document and includes an error indication 810 under the word, "Their", comprising the error 807. Preferably, the error indication 810 is a wavy, green underline. However, in alternative embodiments, the error indication could be any number of indications that would alert the user that there is a possible grammatical error.

When the user wants to bring up the pop-up menu 800, the user clicks a button on the mouse 29 (FIG. 1) while the cursor is positioned over the word or words which comprise the error 807 and the pop-up menu 800 is then displayed beneath the sentence 805. The pop-up menu can also be displayed by other means, such as by entering a command on the keyboard 28 (FIG. 1). In the preferred application program module, the pop-up menu 800 includes a suggestion list box 815, an Ignore Sentence option 820, and a Grammar option 825. A full-sentence rewrite option 830 may also be included in the pop-up menu 800.

The suggestion list box 815 comprises a listing of the suggestions that are received from the grammar checker program module for correcting the error 807. If the user selects one of these suggestions, such as by single clicking a button on the mouse while the cursor is positioned over the suggestion, then the suggestion will be incorporated into the document. Preferably, the top three suggestions for correcting the error are displayed in the suggestion list box 815.

Figure 8:
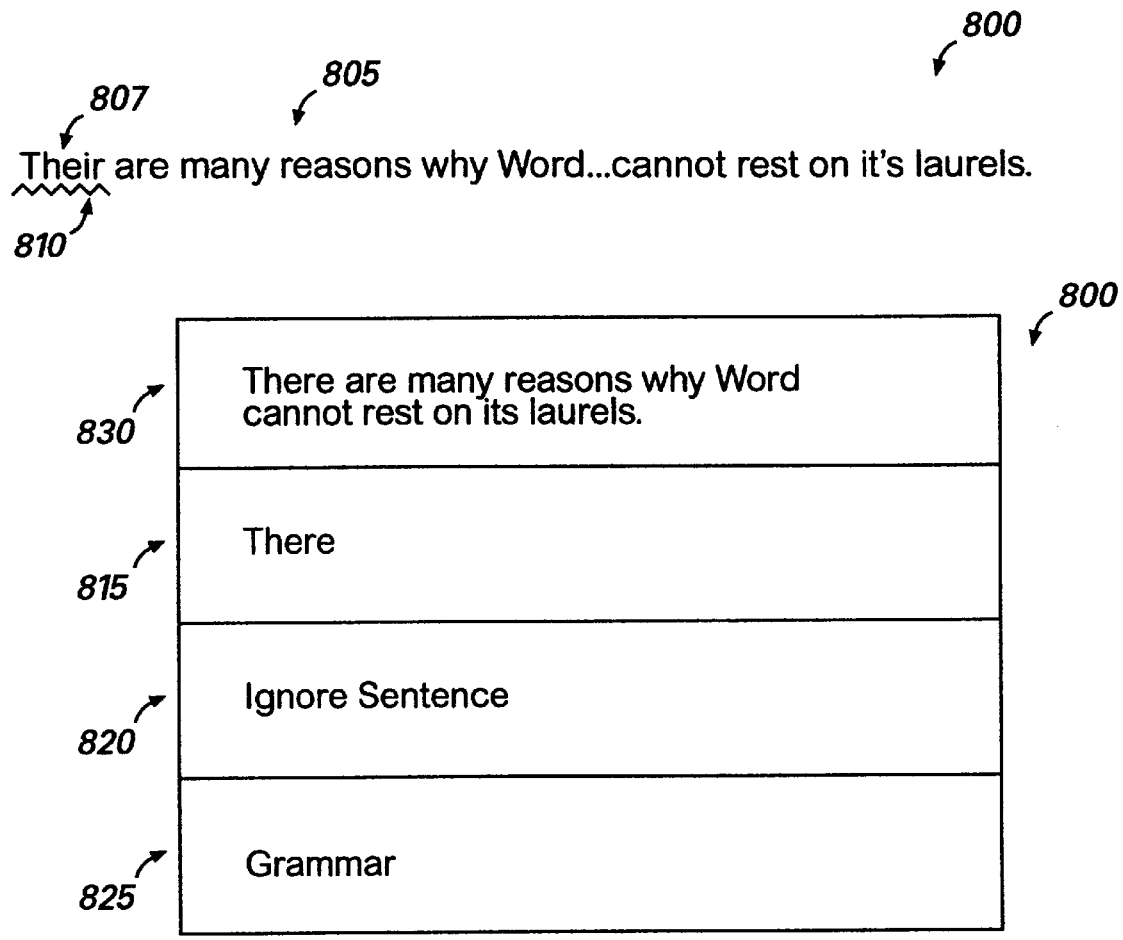
FIG. 8 is an illustration of a grammar pop-up menu that is displayed by the preferred application program module when the user selects an error indication in the electronic document.

Referring to FIG. 8, the suggestion "There" is displayed in the suggestion list box 815. Only one suggestion is listed in the suggestion list box shown in FIG. 8 because only one suggestion was received from the grammar checker program module. However, as mentioned above, the top three suggestions are preferably displayed to the user. If the user selects "There" from the suggestion list box, then the word "Their" comprising the error 807 will be replaced with the suggestion "There" and the pop-up menu 800 will disappear. In addition, it should also be noted that a grammaredit flag will be created for the characters that have been replaced because the document has been edited.

The Ignore Sentence Option 820 allows the user to ignore any possible errors that may have been detected by background grammar checking. If the user selects the Ignore Sentence Option 820, then any errors detected in the sentence will be ignored and the entire sentence will be marked with a grammarclean flag. For example, referring to FIG. 8, if the user selects the Ignore Sentence Option 820, then the sentence 805 will remain unchanged, the pop-up menu will disappear and the entire sentence will be marked with a grammarclean flag. In addition, any other errors in the sentence, such as "it's" in FIG. 8, will be ignored by the grammar checker program module and will not be marked with an error indication 810.

The pop-up menu 800 also includes a Grammar option 825 which is a tunnel to the foreground grammar checker user interface. If the Grammar Option 825 is selected by the user, then the foreground grammar checker user interface is displayed to the user. The foreground grammar checker user interface provides more options to the user than the pop-up menu. For example, the foreground grammar checker user interface may include options such as providing a brief explanation of the grammatical error. The foreground grammar checker user interface, when entered through the Grammar Option 825, is only displayed for the one sentence for which it was selected.

Although not included in the preferred application program module, a full sentence rewrite option 830 may also be included in the pop-up menu 800. The full sentence rewrite option 830 displays the sentence 805 with any errors replaced by a suggestion from the grammar checker program module. Preferably, the sentence 805 is grammar checked and the first error is replaced with the first suggestion for that error that is received from the grammar checker program module. The sentence 805, including the first error replaced by the first suggestion, is then grammar checked again. Any error that is found is replaced by the first suggestion for that error and the sentence is re-checked. This process continues until the no errors are found in the grammar check. The sentence that remains after this process is the full sentence rewrite option 830. When the user selects the full sentence rewrite option 830, the sentence 805 is replaced with the full-sentence rewrite. For example, sentence 805 contains two grammatical errors found in the words "Their" and "it's". The grammar checker program module's first suggestion to replace "Their" is "There". The grammar checker program module's first suggestion to replace "it's" is "its". The full sentence rewrite option 830 displays sentence 805 with these suggestions incorporated into the sentence. If the user selects the full sentence rewrite option 830, then the sentence 805 containing errors is replaced with the sentence displayed in the full sentence rewrite option.

It should be understood that no information concerning suggestions or the type of grammar error are stored in the grammar data table. Instead, this information is obtained from the grammar checker program module when the user invokes the grammar pop-up menus. A buffer of text containing the grammarerror flag is sent to the grammar checker program module. The grammar checker program module returns sentence boundaries. Then, the sentence, as determined by the sentence boundaries received from the grammar checker program module, is returned to the grammar checker program module for grammar checking. The grammar checker program module then grammar checks the sentence and returns any errors and suggestions to replace the error.

It should be further understood that the idle period referred to in the preceding text is very granular depending on the speed at which the personal computer 10 (FIG. 1) can execute instructions. For instance, the present invention may go into idle between characters typed by a user if the processor 14 (FIG. 1) of the personal computer 10 (FIG. 1) executes instructions quickly.

As should be understood from the above description, the present invention provides an error indication of grammatical errors in the context of the document. The present invention also provides a pop-up menu for quick and convenient correction of grammatical errors.

From the foregoing description, it will further be apparent to those skilled in the art that the present invention provides a method and system for verifying the accuracy of the grammatical composition of an electronic document in the background. The user does not have to execute any commands to grammar check the document. Instead, during idle periods, the document is checked to verify that the grammatical composition of the document is correct. Any grammatical errors found by the background grammar checking method and system are displayed to the user in the context of the document. In addition, the present invention provides benefits for the foreground grammar checker because any text that has been checked by the background grammar checker and marked grammarclean can be skipped over by the foreground grammar checker. Thus, the speed and efficiency of foreground grammar checking is increased.

Although the present invention has been described above as implemented in. the preferred word processing program, it will be understood that alternative embodiments will become apparent to those skilled in the art to which the present invention pertains without departing from its spirit and scope. For example, the present invention could be implemented as a stand-alone grammar checker program module, a stand-alone proofing program module, or in a number of different application program modules, such as a spreadsheet program module or electronic mail program module, among others. Accordingly, the scope of the present invention is defined by the appended claims rather than the foregoing description.

What is claimed is:

1. In a word processing system operative to create a document, a grammar checking program comprising:

a grammar pop-up menu comprising a plurality of suggestions to replace at least one grammatical error in the document, the grammar pop-up menu being displayed when an error indication is selected, the error indication being displayed in the document and indicative of a possible grammatical error in the document, the grammar pop-up menu further comprising a full-sentence rewrite option comprising an edited sentence that, when selected by the user, replaces each grammatical error with one of the plurality of suggestions.

2. The grammar checking program recited in claim 1, wherein the error indication is determined by grammar checking the document during an idle period.

3. The grammar checking program recited in claim 1, further operable for performing the steps of:

(a) creating grammar flags in response to a user entering characters into the document, the grammar flags corresponding to the grammar status of character ranges in the document;

(b) grammar checking the sentences during idle periods when the user is not entering commands;

(c) updating the grammar flags in response to grammar checking the sentences, wherein the grammar flags comprise a plurality of edit flags and a plurality of dirty flags, further comprising the step of updating the grammar flags in response to editing of the document by:
scanning the document for a first one of the edit flags;
in response to finding the first edit flag, determining a beginning character position and an end character position of a first sentence that includes the characters that correspond to the first edit flag; and
marking the first sentence with one of the dirty flags.

4. The grammar checking program recited in claim 3, further operable for performing the step of storing the grammar flags and character positions in a grammar data table to identify the character range associated with each grammar flag.

5. The grammar checking program recited in claim 4, wherein the grammar flags include a dirty flag to indicate that one of the character ranges needs to be grammar checked.

6. The grammar checking program recited in claim 5, wherein the grammar checking step comprises using the grammar flags to determine one of the character ranges to grammar check.

7. The grammar checking program recited in claim 6, wherein the step of using the grammar flags to determine one of the character ranges to grammar check comprises searching through the document for one of the character ranges that is associated with the dirty flag.

8. The grammar checking program recited in claim 1, further operable for performing the steps of: the steps of:

(a) determining whether there is an idle period, the idle period comprising a time period between commands entered, characters typed and other events;

(b) in response to detecting the idle period, determining a text run of the electronic document to grammar check, the text run comprising a portion of the electronic document;

(c) determining whether there is a first dirty flag in the text run;

(d) if there is a first dirty flag in the text run, then extracting a sentence corresponding to the first dirty flag from the electronic document;

(e) grammar checking the extracted sentence;

(f) determning whether the extracted sentence contains at least one grammatical error;

(g) if the extracted sentence contains at least one grammatical error, then marking characters corresponding to the grammatical error with an error flag and presenting an error indication; and (h) if the sentence does not contain at least one grammatical error, then marking characters corresponding to the sentence with a clean flag.

9. The grammar checking program recited in claim 8, further operable for per forming the steps of:

(i) determining whether the text run includes a second dirty flag;

(j) if the text run contains a second dirty flag, then extracting a sentence corresponding to the second dirty flag and repeating steps (e)–(h).

10. The grammar checking program recited in claim 8, further operable for performing the steps of:

(i) determining whether there is a first out-of-date error flag in the text run;

(j) if there is a first out-of-date error flag in the text run, then extracting a sentence corresponding to the first out-of-date error flag from the document;

(k) grammar checking the extracted sentence corresponding to the out-of-date error flag;

(f) determining whether the extracted sentence corresponding to the out-of-date error flag contains at least one grammatical error;

(g) if the extracted sentence corresponding to the out-of-date error flag contains at least one grammatical error, then marking characters corresponding to the grammatical error with an error flag and presenting an error indication; and (h) if the sentence corresponding to the out-of-date error flag does not contain at least one grammatical error, then marking characters corresponding to the sentence with a clean flag.

11. The grammar checking program recited in claim 8, wherein the sentence-extracting step comprises sentence-breaking to determine a beginning and an end of the sentence that corresponds to the dirty flag.

12. The grammar checking program recited in claim 8, wherein the sentence-extracting step comprises the steps of:

calling a grammar checker program module;

transferring a buffer of text to the grammar checker program module, the buffer of text comprising the sentence corresponding to the first dirty flag; and receiving sentence indices from the grammar checker program module, the sentence indices indicative of a beginning and an end of one of the sentence corresponding to the first dirty flag.

13. The grammar checking program recited in claim 8, wherein the step of grammar checking the extracted sentence comprises the steps of:

calling a grammar checker program module;

sending the extracted sentence to the grammar checker program module;

verifying the accuracy of the grammatical composition of the extracted sentence; and receiving error information from the grammar checker program module.

14. A computer storage medium storing a computer-executable program operable for performing the steps of:

displaying a grammar pop-up menu comprising a plurality of suggestions to replace at least one grammatical error in the document, the grammar pop-up menu being displayed when an error indication is selected, the error indication being displayed in the document and indicative of a possible grammatical error in the document, the grammar pop-up menu further comprising a full-sentence rewrite option comprising an edited sentence that, when selected by the user, replaces each grammatical error with one of the plurality of suggestions.

15. The computer storage medium recited in claim 14, wherein the error indication is determined by grammar checking the document during an idle period.

16. The computer storage medium recited in claim 15, wherein the computer-executable program is further operable for performing the steps of:

(a) creating grammar flags in response to a user entering characters into the document, the grammar flags corresponding to the grammar status of character ranges in the document;

(b) grammar checking the sentences during idle periods when the user is not entering commands;

(c) updating the grammar flags in response to grammar checking the sentences, wherein the grammar flags comprise a plurality of edit flags and a plurality of dirty flags, further comprising the step of updating the grammar flags in response to editing of the document by:

scanning the document for a first one of the edit flags;

in response to finding the first edit flag, determining a beginning character position and an end character position of a first sentence that includes the characters that correspond to the first edit flag; and marking the first sentence with one of the dirty flags.

17. The computer storage medium recited in claim 16, wherein the computer-executable program is further operable for performing the step of storing the grammar flags and character positions in a grammar data table to identify the character range associated with each grammar flag.

18. The computer storage medium recited in claim 17, wherein the grammar flags include a dirty flag to indicate that one of the character ranges needs to be grammar checked.

19. The computer storage medium redted in claim 18, wherein the grammar checking step comprises using the grammar flags to determine one of the character ranges to grammar check.

20. The computer storage medium recited in claim 19, wherein the step of using the grammar flags to determine one of the character ranges to grammar check comprises searching through the document for one of the character ranges that is associated with the dirty flag.

21. The computer storage medium recited in claim 14, wherein the computer-executable program is further operable for performing the steps of:

(a) determining whether there is an idle period, the idle period comprising a time period between commands entered, characters typed and other events;

(b) in response to detecting the idle period, determining a text run of the electronic document to grammar check, the text run comprising a portion of the electronic document;

(c) determining whether there is a first dirty flag in the text run;

(d) if there is a first dirty flag in the text run, then extracting a sentence corresponding to the first dirty flag from the electronic document;

(e) grammar checking the extracted sentence;

(f) determining whether the extracted sentence contains at least one grammatical error;

(g) if the extracted sentence contains at least one grammatical error, then marking characters corresponding to the grammatical error with an error flag and presenting an error indication; and (h) if the sentence does not contain at least one grammatical error, then marking characters corresponding to the sentence with a clean flag.

22. The computer storage medium recited in claim 14, wherein the computer-executable program is further operable for performing the steps of:

(i) determining whether the text run includes a second dirty flag;

(j) if the text run contains a second dirty flag, then extracting a sentence corresponding to the second dirty flag and repeating steps (e)–(h).

23. The computer storage medium redted in claim 14, wherein the computer-executable program is further operable for performing the steps of:

(i) determining whether there is a first out-of-date error flag in the text run;

(j) if there is a first out-of-date error flag in the text run, then extracting a sentence corresponding to the first out-of-date error flag from the document;

(k) grammar checking the extracted sentence corresponding to the out-of-date error flag;

(f) determining whether the extracted sentence corresponding to the out-of-date error flag contains at least one grammatical error;

(g) if the extracted sentence corresponding to the out-of-date error flag contains at least one grammatical error, then marking characters corresponding to the grammatical error with an error flag and presenting an error indication; and (h) if the sentence corresponding to the out-of-date error flag does not contain at least one grammatical error, then marking characters corresponding to the sentence with a clean flag.

24. The computer storage medium recited in claim 14, wherein the sentence-extracting step comprises sentence-breaking to determine a beginning and an end of the sentence that corresponds to the dirty flag.

25. The computer storage medium recited in claim 14, wherein the sentence-extracting step comprises the steps of:

calling a grammar checker program module;

transferring a buffer of text to the grammar checker program module, the buffer of text comprising the sentence corresponding to the first dirty flag; and receiving sentence indices from the grammar checker program module, the sentence indices indicative of a beginning and an end of one of the sentence corresponding to the first dirty flag.

26. The computer storage medium recited in claim 14, wherein the step of grammar checking the extracted sentence comprises the steps of:

calling a grammar checker program module;

sending the extracted sentence to the grammar checker program module;

verifying the accuracy of the grammatical composition of the extracted sentence; and receiving error information from the grammar checker program module.

\* \* \* \* \*